United States Patent [19]

Grosjean

[11] Patent Number: 4,629,924
[45] Date of Patent: Dec. 16, 1986

[54] MULTIPHASE MOTOR WITH MAGNETIZED ROTOR HAVING N/2 PAIRS OF POLES AT ITS PERIPHERY

[76] Inventor: Michel Grosjean, 1, rue des Narcisses, CH-2504 Bienne, Switzerland

[21] Appl. No.: 720,414
[22] PCT Filed: Jul. 30, 1984
[86] PCT No.: PCT/CH84/00120
    § 371 Date: Mar. 28, 1985
    § 102(e) Date: Mar. 28, 1985
[87] PCT Pub. No.: WO85/00706
    PCT Pub. Date: Feb. 14, 1985

[30] Foreign Application Priority Data

Jul. 28, 1983 [CH] Switzerland .................. 4130/83

[51] Int. Cl.⁴ .................................................. H02K 37/00
[52] U.S. Cl. ................................ 310/257; 310/49 R; 310/156
[58] Field of Search ............. 310/40 MM, 49 R, 156, 310/164, 213, 162, 257

[56] References Cited

U.S. PATENT DOCUMENTS

| | | | |
|---|---|---|---|
| 3,989,967 | 11/1976 | Kikuyama et al. | 310/164 |
| 4,075,540 | 2/1978 | Torisawa | 318/138 |
| 4,207,483 | 6/1980 | Baer | 310/49 R |
| 4,336,471 | 6/1982 | Plancon | 310/49 R |
| 4,355,252 | 10/1982 | Lechner et al. | |
| 4,455,499 | 6/1984 | Sudler | 310/49 R |
| 4,558,244 | 12/1985 | Nikaido et al. | 310/49 R |

FOREIGN PATENT DOCUMENTS

| | | |
|---|---|---|
| 1741193 | 3/1957 | Fed. Rep. of Germany . |
| 2938771 | 4/1981 | Fed. Rep. of Germany . |
| 1029621 | 6/1953 | France . |
| 1238445 | 7/1960 | France . |
| 2209246 | 6/1974 | France . |
| 2283576 | 3/1976 | France . |
| 2417880 | 9/1979 | France . |
| 2435150 | 3/1980 | France . |
| 2458170 | 12/1980 | France . |
| 1531314 | 11/1978 | United Kingdom . |
| 1537048 | 12/1978 | United Kingdom . |
| 2014800A | 8/1979 | United Kingdom . |
| 1586056 | 3/1981 | United Kingdom . |

OTHER PUBLICATIONS

Rapport De Recherche Internationale PCT/CH 84/00112.

Primary Examiner—Patrick R. Salce
Assistant Examiner—D. L. Rebsch
Attorney, Agent, or Firm—Parkhurst & Oliff

[57] ABSTRACT

A compact, energy efficient motor having a rotor including N/2 pairs of rotor poles located about the periphery of the rotor, the rotor poles having alternating opposite polarities. The rotor is surrounded by a stator including stator poles concentric to the rotor. The motor is a multiphase motor, each phase including two polar pieces, an internal polar piece and an external polar piece, the polar pieces being interpositioned one within the other. One phase of the motor includes a polar piece having fractional stator poles. A motor constructed according to the invention has no loss of magnetic flux, because the magnetic flux generated by the magnetized rotor poles is always closed upon itself. This increases the efficiency of the motor, and allows high power output with compact size.

3 Claims, 6 Drawing Figures

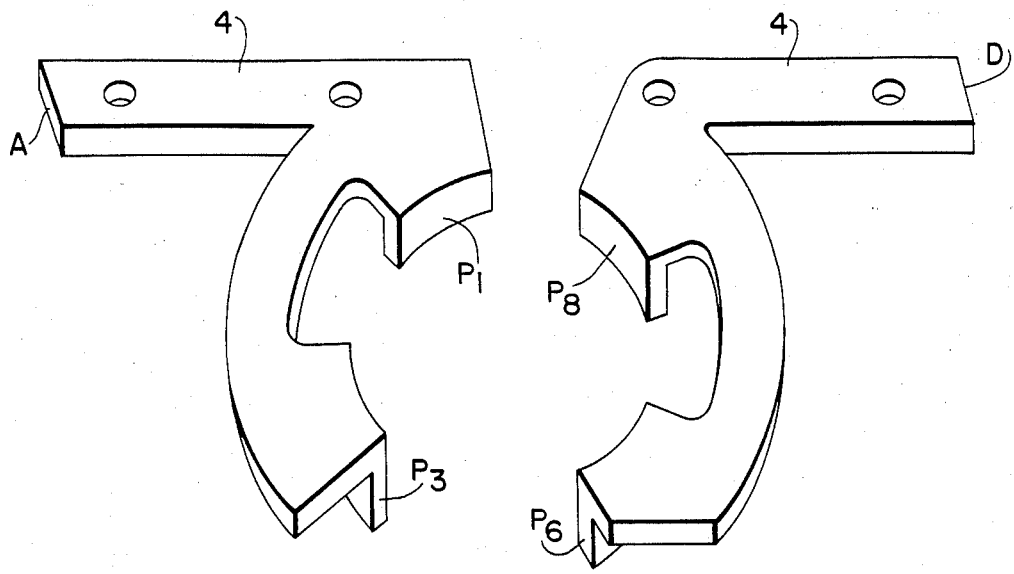
Fig. 2
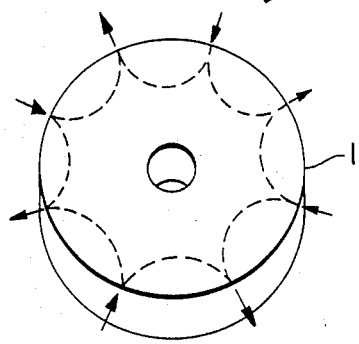
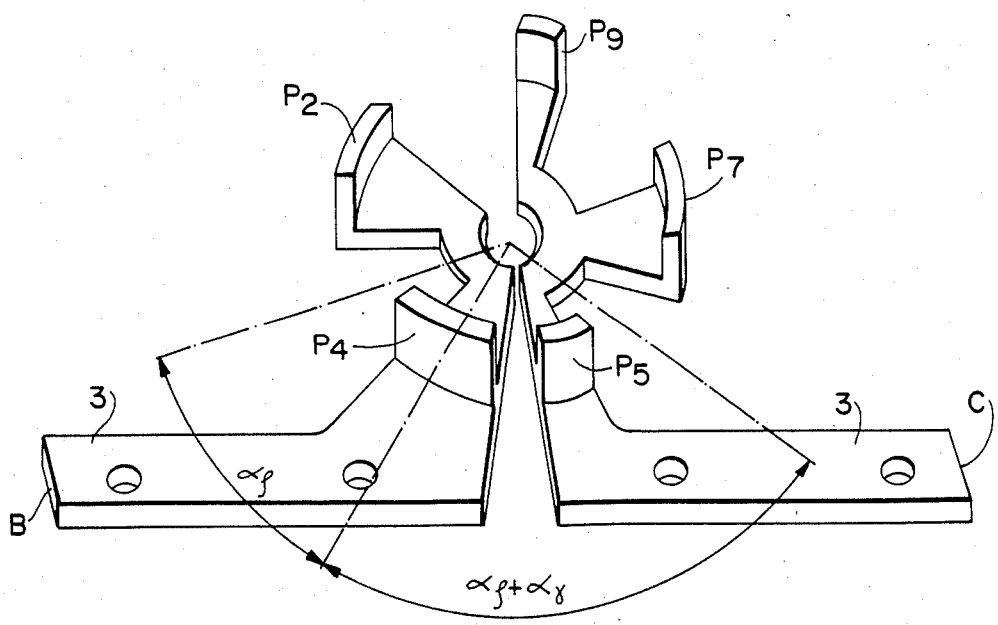

MULTIPHASE MOTOR WITH MAGNETIZED ROTOR HAVING N/2 PAIRS OF POLES AT ITS PERIPHERY

This invention relates to multiphase motors with magnetized rotor having N/2 pairs of poles at its periphery.

Different types of motors with magnetized rotor exist. According to the present invention the pole pairs of the rotor can be defined by magnetization curves contained in a plane perpendicular to the axis of rotation of the rotor so that the latter has N poles of alternate opposite polarity at its periphery.

A principal object of the inventions to create a multiphase motor having high efficiency by using existing materials, which is easily to be manufactured by industrial processes and the phase number of which, as well as the range of powers, can be very extensive without modifying the motor concept.

The field of applications of the motor according to the present invention is thus very large. This motor can particularly be used with driving systems for office automation, robots, aeronautical and space industry, photographic installations and, time-keepers. More generally, the motor according to the present invention is suitable to all the systems using digital techniques, and, more particularly, to all those with which cumbersomeness, output power and speed constitute critical criteria.

One embodiment of the motor according to the invention and two variants are represented diagramatically and simply by way of example in the drawings in which:

FIG. 2 is an exploded perspective view of the essential pieces of that embodiment;

Figure 4:
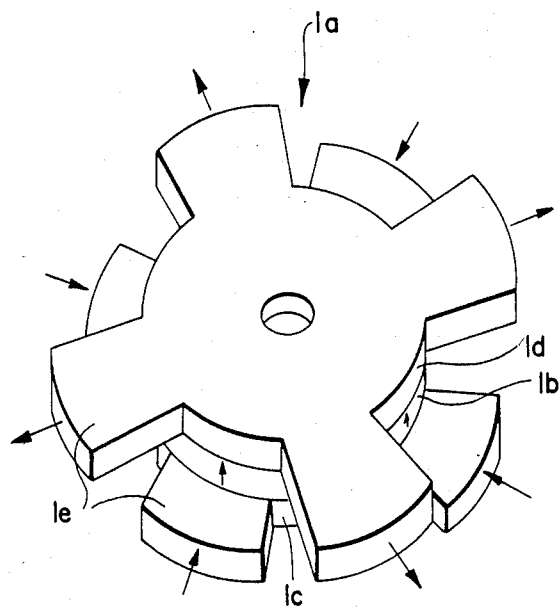

FIG. 4 a perspective view of a piece of the variant and

Figure 5:
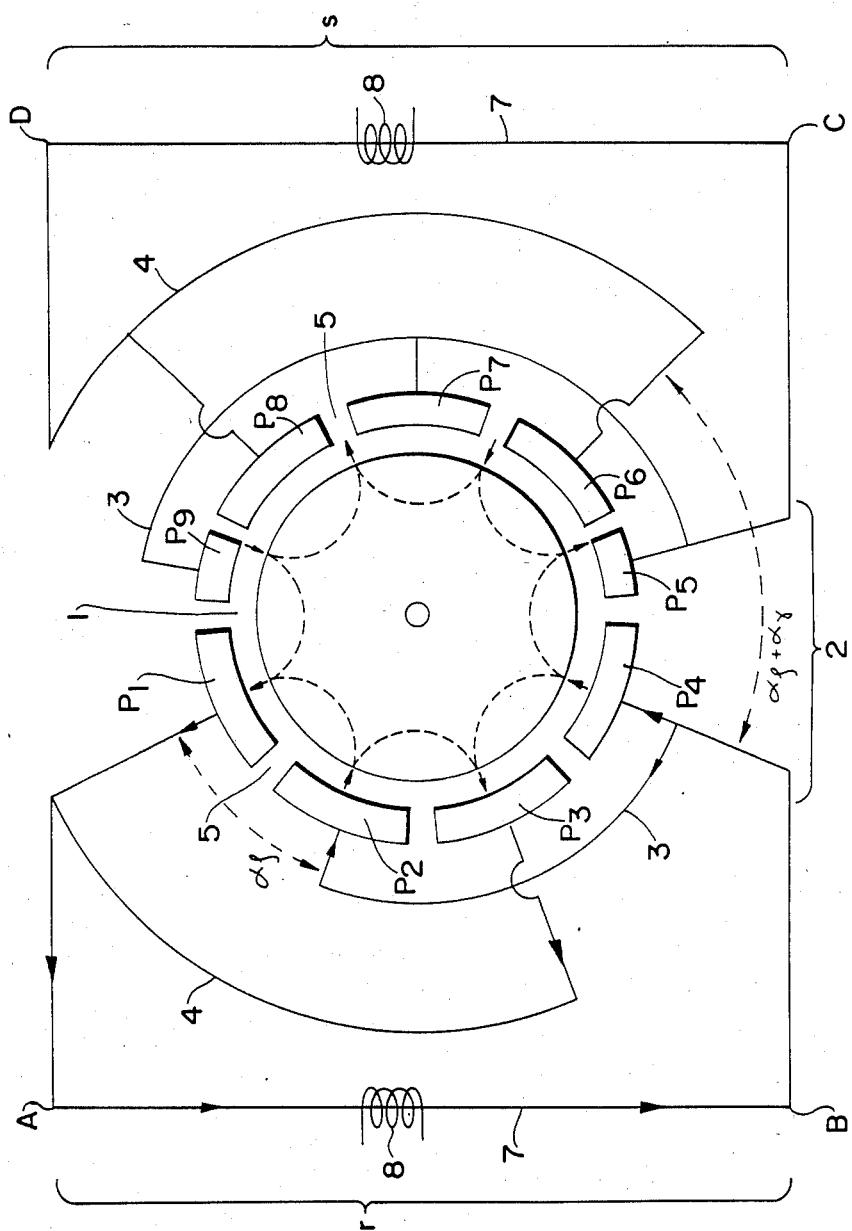
Figure 6:
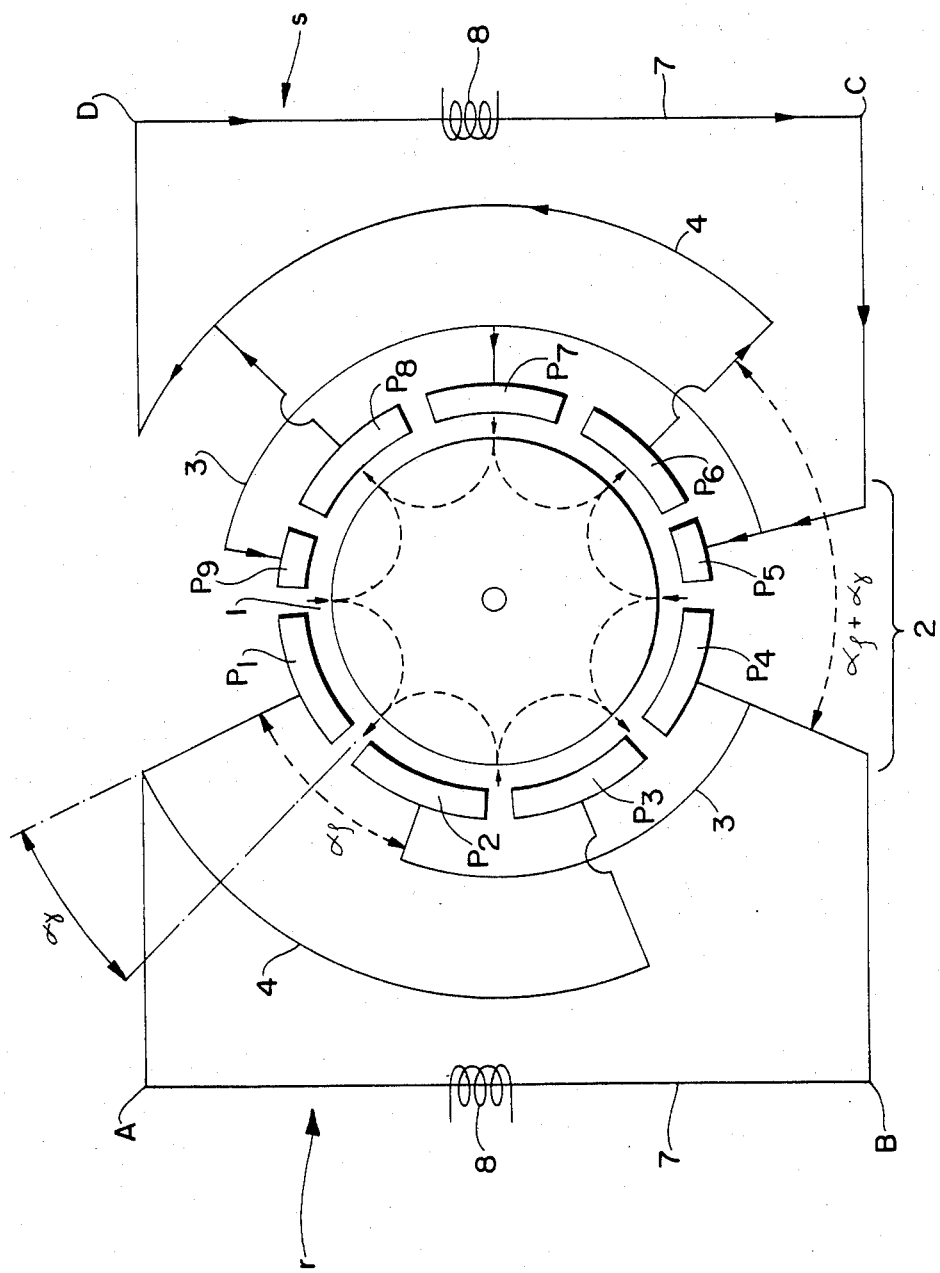

FIGS. 5 and 6 are equivalent diagrams of the motor illustrating its mode of operation.

Figure 1:
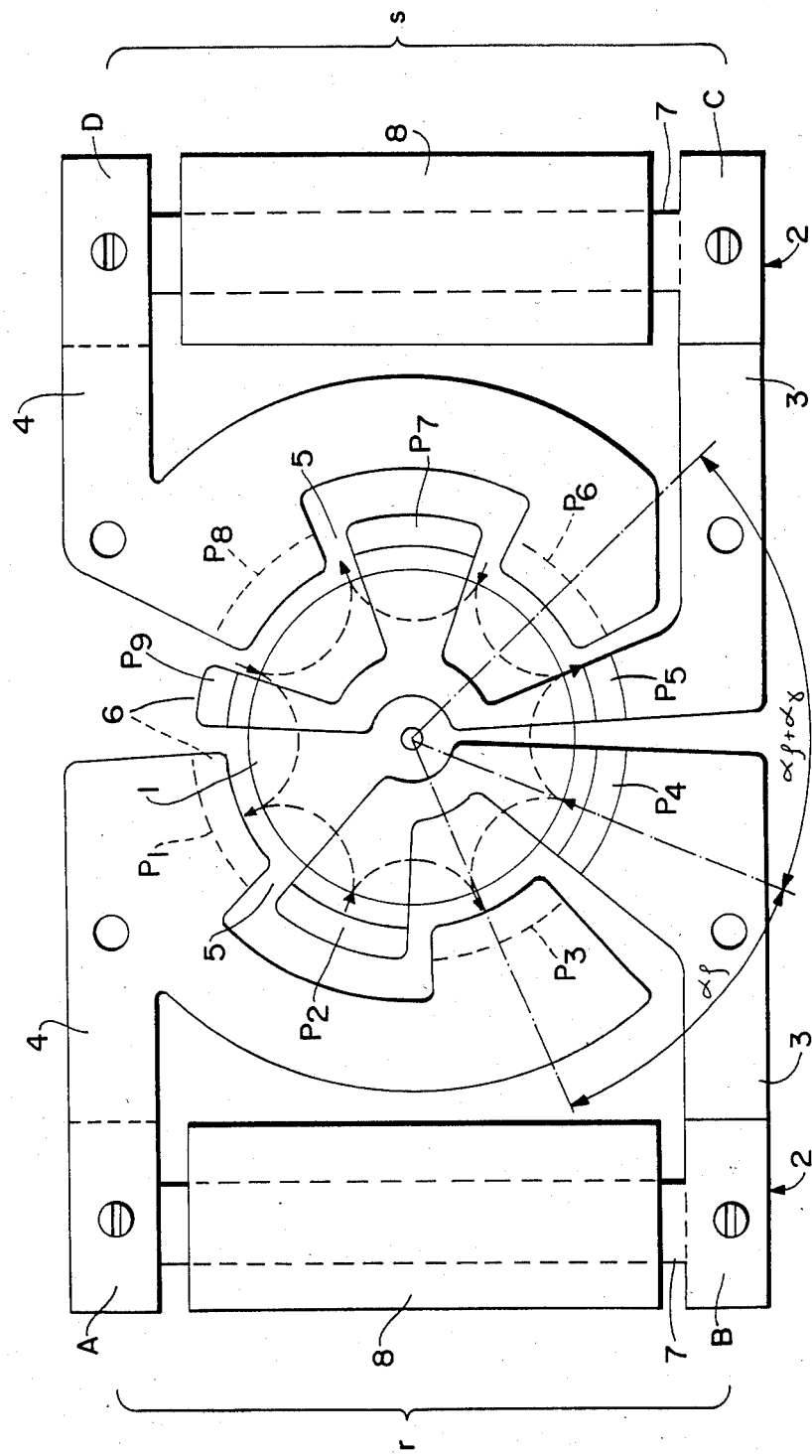
FIG. 1 is a view of that embodiment in the direction of the axis of rotation of the rotor.

The motor represented in FIGS. 1 and 2 has a rotor 1 provided with a number N of poles equal to eight. The number m of its phases is equal to two. Moreover the shifting between these two phases is equal to $2\pi/Nm$, i.e. 22.5°.

The rotor 1 is of ferromagnetic material such as samarium-cobalt, the coercive force of which is high and the mass small. It has four pairs of poles at its periphery which can be defined by magnetization flux lines contained in a plane perpendicular to the axis of rotation of the rotor. At its periphery, the latter thus has eight poles of alternate opposite polarity, which are regularly distributed.

The rotor 1 is surrounded by a stator 2, the poles of which are concentric to the rotor. This stator comprises a number m of phases (r, s) equal to two. Each phase comprises two polar pieces 3, 4 interleaved in one another. They are separated from one another by a sinuous air-gap 5 in each phase.

The polar pieces 3, 4 are of ferromagnetic material having a small coercive force and a high saturation induction. They have poles $p_1, p_2, \ldots p_9$.

FIG. 1 shows that poles $p_1$, $p_3$ of polar piece 4 of phase r, poles $p_2$, $p_4$ of polar piece 3 of the same phase r, poles $p_6$, $p_8$ of polar piece 4 of phase s and pole $p_7$ of polar piece 3 of this phase s each have, the same arc.

These different poles are called full poles, whereas poles $p_5$ and $p_9$ of polar piece 3 of phase s are fractional poles. The sum of the arcs of these two fractional poles is at least approximately equal to the arcs of a full pole.

In the general case of a motor with m phases, and N rotor poles, the poles of phases polar pieces of $m-1$ and those of one polar piece of the mth phase are full; they are $\frac{1}{2}N/m$ in number per polar piece and they are arranged at an angular interval at least approximately equal to twice that between two adjacent poles at the perihery of the rotor. As regards the poles of the remaining polar piece, there are $(\frac{1}{2}N/m)-1$ which are full, whereas the m remaining poles are fractional, the sum of their arcs being at least approximately equal to the arc of a full pole.

With the embodiment represented, one of the phases r, s is displaced with respect to the other one through an angle $\alpha_\gamma$ of 22.5°. In the general case of a motor with m phases, the rotor of which has N poles at its periphery, $\alpha_\gamma = 2\pi/Nm$. The arcs of every fractional pole is at least approximately equal to $1/m$ times that of a full pole.

The displacement $\alpha_{65}$ can be made different from $2\pi/Nm$. In this case, the sum of the angular extensions of the fractional poles remains at least approximately equal to the angular extension of a full pole, but all these fractional poles no longer have the same arc.

Figure 3:
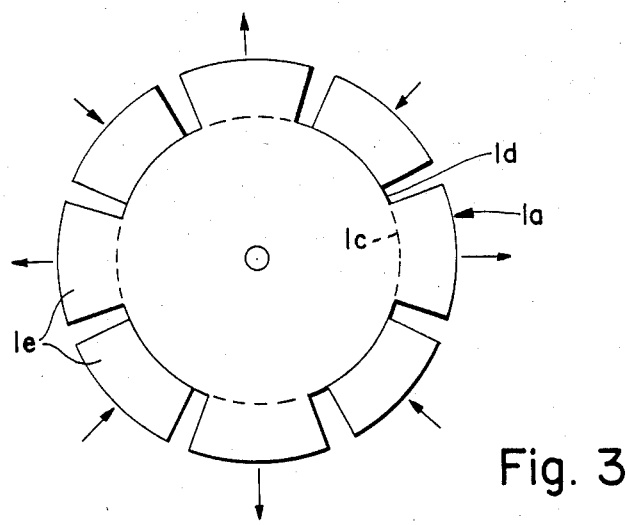
FIG. 3 is a plan view.

With the variant represented in FIGS. 3 and 4, the rotor 1a comprises a magnet 1b having an axial magnetization parallel to the axis of rotation of the rotor. To obtain the same behavior as in the case of the embodiment disclosed hereabove, a soft ferromagnetic disk 1c, 1d with projecting poles 1e is fixed against each face of magnet 1b. Due to that arrangement, and although the magnetization axis of the rotor is parallel to its axis of rotation, the rotor 1a has eight poles at its periphery, which are regularly distributed and have alternate opposite polarity. The fluxes of rotor 1a are indicated by arrows.

FIGS. 5 and 6 illustrate the operation of the motor. They are equivalent diagrams of the motor. The shift of phases r, s is 22.5°.

FIG. 6 shows the state of the motor when the rotor has turned through an angle of 22.5° with respect to that shown in FIG. 5, i.e., in the general case, through an angle $\alpha_\gamma = 2\pi/Nm$. The magnetic connections are symbolically represented by continuous lines.

In order to facilitate understanding the operation of the motor represented, the determination of the characteristic curve called mutual torque is first disclosed. The mutual torque is that due to the interaction between the magnetic fluxes of the rotor and those of the coils.

In the position of FIG. 5, some poles of rotor 1 are exactly opposite poles $p_1$, $p_2$, $p_3$ and $p_4$ of phase r. That Figure shows that the rotor fluxes directed toward the stator are received by poles $p_1$ and $p_3$ of polar piece 3 from which they are directed to core 7 of phase r, through which they flow from A to B. They are then closed after having passed through poles $p_2$ and $p_4$ of polar piece 3 of the stator phase r.

Upon displacing the rotor from that position through an angle $\alpha_\rho$ equal to $2\pi/N$, it is easy to see that the flux through core 7 of phase r is once again maximum, but in the opposite direction, i.e., it flows through this core from B to A. There is thus a reversal of the rotor flux in core 7 of phase r, every time the rotor turns through an angle equal to $2\pi/N$, in the example represented 45.

When the coil of phase r is driven, an interaction torque results between the coil and the magnetized rotor, the so called mutual torque, the period of which is equal to $4\pi/N$, and the neutral positions of which correspond to the rotor positions in which the poles of the rotor are exactly opposite the poles of the polar pieces of this phase r.

As regards poles $p_5$, $p_6$, $p_7$, $p_8$ and $p_9$ of phase s, between which are the poles of the rotor in FIG. 5, it is easy to see that this phase s also has a mutual torque with a period of $4\pi/N$, but displaced with respect to the mutual torque of phase r through an angle $a_\gamma = 2\pi/Nm$, thus of 22.5° in the example presented.

The rotor position in which its flux through core 7 of phase s is maximum is that of FIG. 6. The two fractional poles $p_5$ and $p_9$ each receive, a flux equal to $1/m$ times the flux received by a full pole, thus to $\frac{1}{2}$ time that of a full pole in the presented example.

The remarks made hereabove with respect to an angular displacement of the phases different from $2\pi/Nm$ are applicable here too.

The motor behavior with the indicated mutual torques, when the coils are driven is known and will not be disclosed.

The two-phase motor represented with a rotor having eight poles at its periphery is obviously not the only possible embodiment of the motor according to the invention. The relation $m=N/2n$ between the number N of rotor poles and that of the m phases, n being an integer, need only be satisfied. The following table indicates the possible configurations of the motor according to the invention.

| m | n | N |
|---|---|---|
| 2 | 1 | 4 |
| two-phase | 2 | 8 |
|  | 3 | 12 |
|  | 4 | 16 |
|  | ... | ... |
|  | ... | ... |
| 3 | 1 | 6 |
| three-phase | 2 | 12 |
|  | 3 | 18 |
|  | 4 | 24 |
|  | ... | ... |
|  | ... | ... |
| 4 | 1 | 8 |
| four-phase | 2 | 16 |
|  | 3 | 24 |
|  | 4 | 32 |
|  | ... | ... |
|  | ... | ... |
| ... | ... | ... |

Regarding the efficiency of the motor according to the invention and without going into the details of theory, those skilled in the art will note that it is high.

At first, the fluxes of all the pole pairs of the rotor flow in the same direction through each coil core, because of the disclosed interleaving of polar pieces 3, 4 and of the provision of full and fractional poles. There is, indeed, no pole pair of the rotor, the flux of which would be lost, i.e. would not be closed through the cores and would not contribute in an additive manner to the mutual flux.

Moreover, when the motor shall operate stepwise, the fact that the rotor is plain, i.e. has no angular gap between the rotor poles which would not be equal to $2\pi/N$, optimizes, from the view point of the efficiency, the relation between the total flux of the pole pairs of the rotor and the inertia of the rotor. That is due to the fact that the efficiency is a function increasing with the flux and decreasing with the inertia, but that the power to which that function increases with the flux is higher than that to which it decreases with the inertia.

The phase number of the motor according to the invention can be very great without modifying the motor concept, since it suffices that the relation $m=N/2n$ be satisfied for n integer. In other words, it suffices to increase the number N of pole pairs of the rotor in order to increase the number m of phases.

The motor according to the invention has also the advantage of offering a very large range of powers, without having to modify the motor concept. Without going into the details of theory, it is, indeed, intuitive to observe that the mechanical power of a motor of this type is a function increasing with the number of pole pairs of the rotor.

I claim:

1. A multiphase motor with magnetized rotor having $N/2$ pairs of rotor poles at its periphery, wherein said rotor poles result from magnetization flux lines of the rotor which are contained in a plane perpendicular to the axis of rotation of said rotor, and wherein said rotor poles are regularly distributed at the rotor periphery and have alternate opposite polarity, wherein the rotor is surrounded by a stator the poles of which are concentric to the rotor, said stator being formed with m phases, wherein $m=N/2n$, n being a positive integer, and m being a positive integer greater than 1, wherein every phase comprises two polar pieces interpositioned one in the other one and separated therefrom by a sinuous air-gap, wherein, for $m-1$ phases as well as for a first polar piece of the remaining phase, the stator poles of every polar piece, being $n=N/2m$ in number, are full and separated from one another by an angular interval at least approximately twice as large as that between the adjacent rotor poles at the periphery of the rotor, and $(N/2m)-1$ stator poles of a second polar piece of the remaining phase are full, wherein the m remaining stator poles of said second polar piece are fractional, the sum of their arcs being at least approximately equal to the arc of a full stator pole, wherein the phases are displaced with respect to one another, wherein the polar pieces of every phase are magnetically connected to one another by a core and wherein at least one coil is wound around every core.

2. A motor according to claim 1, wherein the phases are displaced with respect to one another through an angle approximately equal to $2\pi/Nm$, and the angular extension of every fractional stator pole is at least approximately equal to $1/m$ times that of a full stator pole.

3. A motor according to claim 1 or 2, wherein the rotor comprises a magnet having two faces and having an axial magnetization parallel to the axis of rotation of the rotor, and a soft ferromagnetic disk having projecting poles fixed against each one of the two faces of the magnet, wherein said projecting poles of each disk, $N/2$ in number, are regularly distributed at the periphery of the rotor, the projecting poles of one disk being displaced with respect to those of the other disk through an angular interval equal to half that between the adjacent projecting poles of one disk.

* * * * *